July 9, 1968 A. W. THIEL 3,392,223
METHOD FOR PRODUCING THERMOPLASTIC ARTICLES
HAVING THIN DOUBLE WALLS
Filed May 5, 1966 3 Sheets-Sheet 1
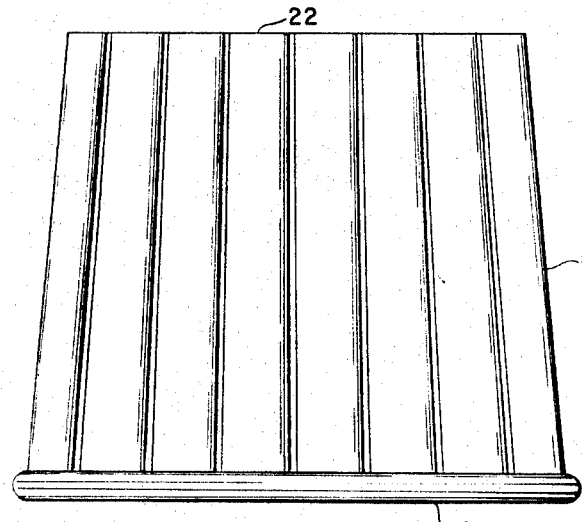
FIG. 1
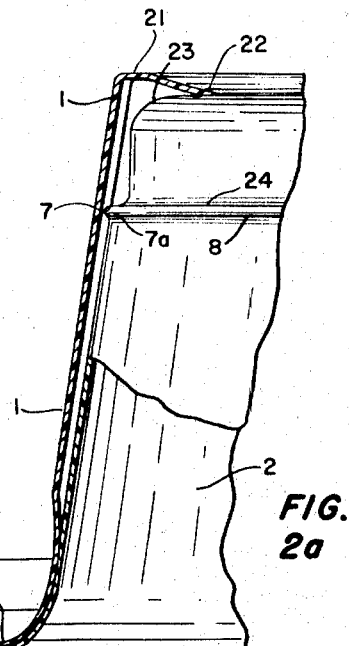
FIG. 2a
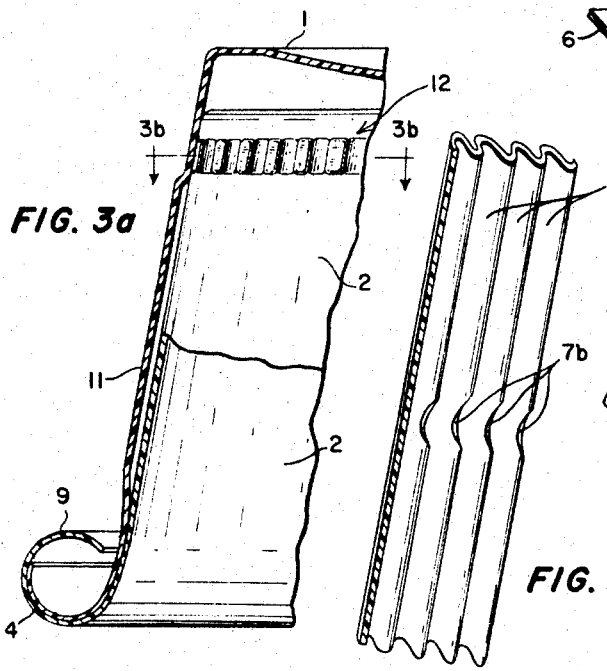
FIG. 3a
FIG. 2d
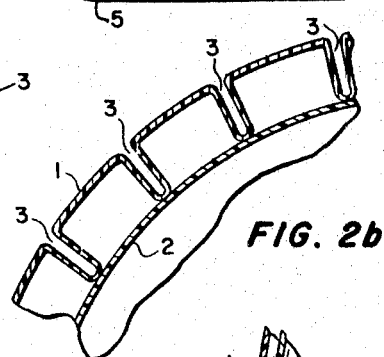
FIG. 2b
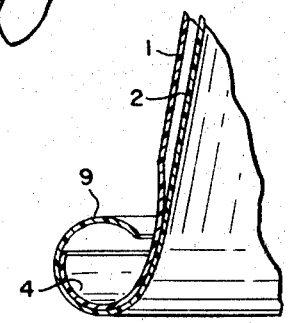
FIG. 2c
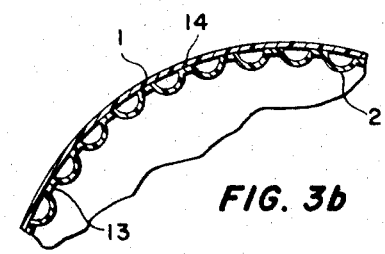
FIG. 3b
INVENTOR.
ALFONS W. THIEL
BY
Strauch, Nolan, Neale,
Nies & Bronaugh
ATTORNEYS

INVENTOR.
ALFONS W. THIEL

BY Strauch, Nolan, Neale,
Nies & Bronaugh

ATTORNEYS

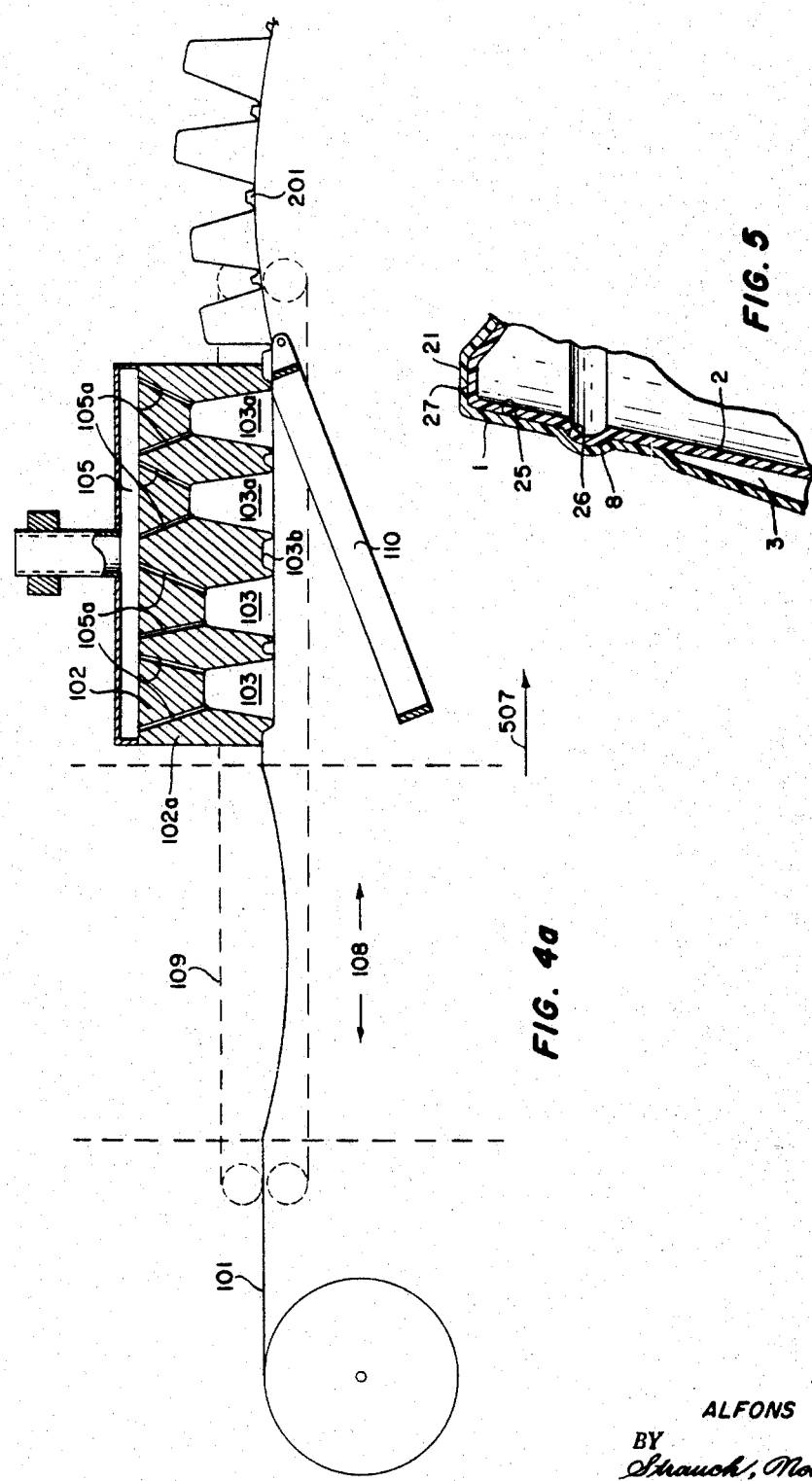

United States Patent Office 3,392,223
Patented July 9, 1968

3,392,223
METHOD FOR PRODUCING THERMOPLASTIC ARTICLES HAVING THIN DOUBLE WALLS
Alfons W. Thiel, Kaiserstrasse 63, Mainz (Rhine), Germany
Continuation-in-part of application Ser. No. 400,642, Oct. 1, 1964. This application May 5, 1966, Ser. No. 548,001
18 Claims. (Cl. 264—152)

ABSTRACT OF THE DISCLOSURE

A method for producing cup-shaped, double walled thermoplastic articles having an inner wall defined by a liner and an outer wall defined by a cover, wherein a sheet of thermoplastic material for producing the articles is advanced successively through a forming station and then through a blanking station to shape the liners and covers in successive batches at the forming station, to blank out each batch of the thusly shaped liners and covers at the blanking station, and to dispense the thusly blanked-out batch of covers from the blanking station directly onto the liners formed and blanked out in a preceding batch to thereby assemble each cover in nested relation over an associated liner. The internested covers and liners are then transferred to a subsequent station where the open end of the liner is beaded around the open end of its associated cover to form a beaded rim for the finished article.

---

This is a continuation-in-part of my copending application Ser. No. 400,642, filed on Oct. 1, 1964 (now Patent No. 3,283,045 issued Nov. 1, 1966) for Process and Apparatus for the Production of Thin-Walled Plastic Articles. Application Ser. No. 400,642 is a divisional application from my copending parent application Ser. No. 51,669 (now Patent No. 3,161,915), filed Aug. 24, 1960, which latter application is a continuation-in-part of my parent application Ser. No. 771,864 filed Nov. 4, 1958, and issued Dec. 13, 1963, as U.S. Patent No. 3,115,677.

This invention is concerned with a method for producing articles from thermoplastic material, such articles having an inner lining wall and an outer wall which are held together on the opening edge through the use of a beaded rim.

The known manner of producing such double-walled plastic articles has been, until now, difficult and expensive. This has been due to the fact that the liner and outer part has first to be produced separately, most often by a vacuum deep drawing process from thermoplastic sheet material, blanked out from the surrounding material, and, in a separate operation, assembled together. These pairs of liner and outer parts being assembled had then to be fed very carefully into the beading apparatus in order to prevent possible shifting, especially in the edge region of the liner with respect to the outer cover during feeding into the beading apparatus or during the beading operation.

It therefore is the object of this invention to provide an improved and novel method by which the joining of liner and outer parts can proceed very much faster, more simply, and more effectively than before, and by which the feeding of the assembled pairs of liner and outer parts into the beading apparatus need not require the extreme care atendant with prior methods. In this way, the production of double-walled articles according to the present invention, is faster, simpler, and cheaper as compared with production by conventional methods.

The foregoing objects essentially are accomplished by joining the newly formed outer part or cover with the liner immediately after the cover is blanked out of the track or sheet of material. The liner is produced beforehand and placed ready for reception of the outer part. In this way, the cold, or at least already greatly cooled, and thus more stable liner grips the still relatively warm, newly blanked outer part or cover. Immediately after the blanking of the outer part, the two joined pieces can be beaded on the open edge to provide a final fastening. The still warm, newly blanked outer part immediately shrinks slightly on the cold or at least cooler liner so that a certain amount of gripping has already been obtained before the beading operation. Consequently, even at high operational speeds, each pair of pieces (the outer cover and liner) can be fed without exercising great care to the beading apparatus and beaded without danger that one of the pieces will shift relative to the other.

In one embodiment of the invention, the liners and outer covers initially are shaped in batches from plastic material in a continuous deep-draw process and then are immediately blanked or cut out from the track or sheet of plastic material. This initial step yields batches of formed pieces made up half of outer covers and half of liners. After being blanked out, the outer covers are placed on a previously produced batch of liners, while the liners from the instant batch are made ready for reception in the outer covers from the next batch. This embodiment of the invention makes it possible to carry out the method very quickly, simply and cheaply.

Failure-free performance of the method of this invention can still be improved significantly by wedging or locking the liner and the outer cover of the article together during the joining operation and before beading of the edge when the edge of the outer cover is securely seated in the collar of the liner. To accomplish this, the outer cover and the liner are provided with parts which coact to effectively lock the liner and cover together by applying axial pressure during the joining operation.

It is also an object of the invention to provide a novel apparatus for carrying out the method of the preceding object. This apparatus comprises at least one forming machine for the batch production of plastic articles in a track or sheet of material and, in each case, a following blanking machine for blanking or cutting out the formed articles into batches of equal numbers.

The blanking machine has openings in its die table. The blanked out articles fall through these openings onto a transport device which feeds them to the beading machine. According to this invention, the openings in the die table in such a machine are disposed of in such a way that one batch of blanked-out liners are set on a conveyor device and are moved thereby with step-wise motion to positions where they are vertically under the blanking opening through which the covers are dispensed. In this way, the newly blanked-out, warm covers are fed immediately and directly onto the waiting, already cold or at least more greatly cooled liners. Only a single forming machine need be used in the apparatus of this invention when the forming machine is constructed, with respect to the direction of the track of material, to shape covers in the forward half and liners in the rearward half. Similarly, only one blanking machine is required by constructing it to cut out the shaped covers in a forward section and to simultaneously cut out the shaped liners in its rearward half.

Further objects of this invention will appear as the description proceeds in connection with the appended claims and annexed drawings wherein:

FIGURE 1 is an elevation of a plastic double-walled cup constructed according to the principles of this invention;

FIGURE 2a is a fragmentary vertical section of the cup shown in FIGURE 1 and illustrating the bead around the rim thereof in partially finished form;

FIGURE 2b is a fragmentary horizontal section taken through the middle side wall region of the cup shown in FIGURES 1 and 2a;

FIGURE 2c is a fragmentary view similar to FIGURE 2a, but showing the bead around the mouth of the cup in finished form;

FIGURE 2d is a fragmentary perspective view of the outer cup shown in the previous figures;

FIGURE 3a is a vertical section similar to FIGURE 2a and illustrating a finished cup of somewhat different form;

FIGURE 3b is a fragmentary horizontal section of the cup shown in FIGURE 3a and taken through the cup side about midway between the top and bottom thereof;

Figure 4B:
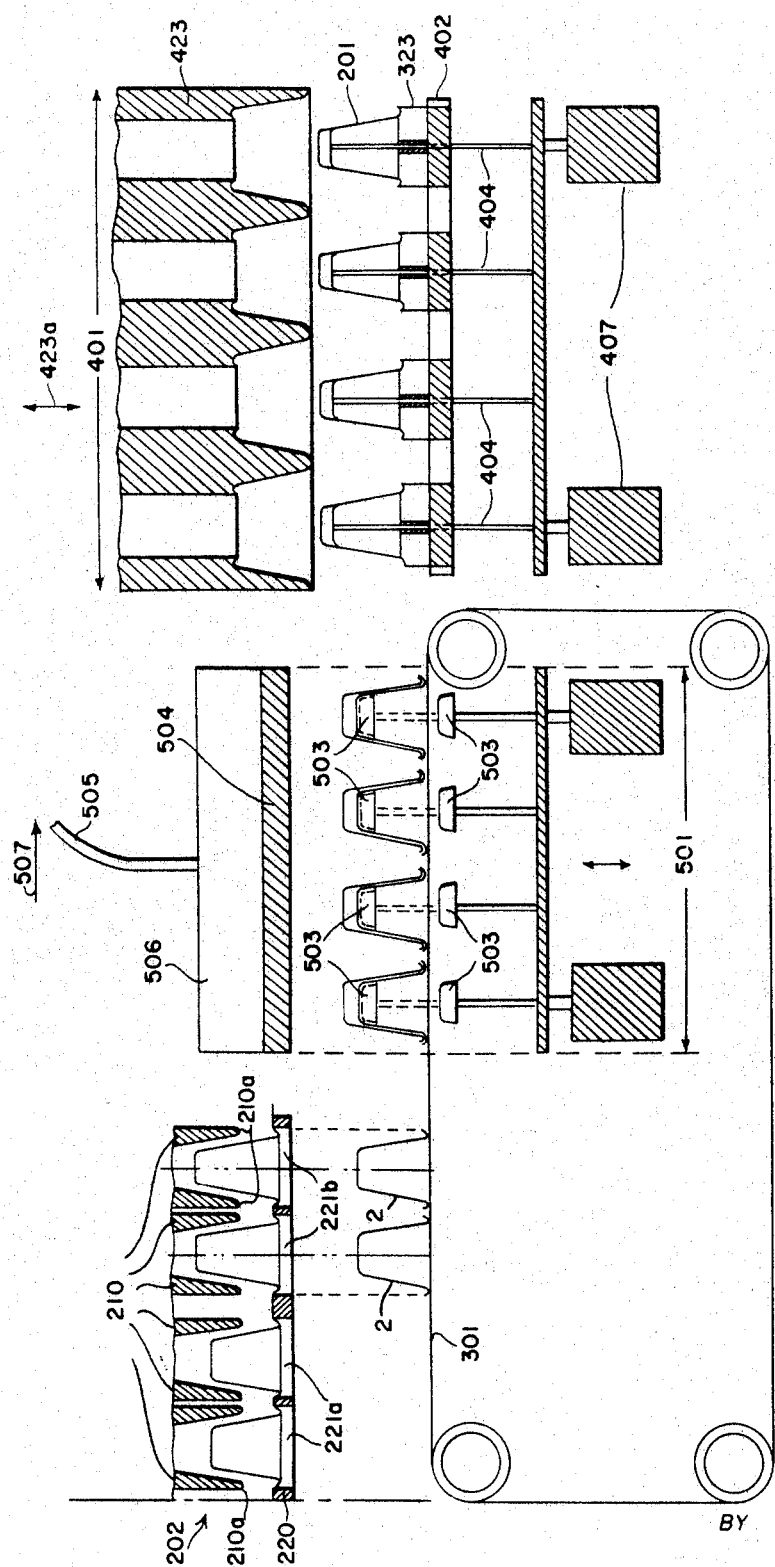

FIGURES 4a and 4b together diagrammatically show a novel apparatus for carrying the method of this invention; and FIGURE 5 is a fragmentary section showing a modification of the double walled cup of this invention.

The embodiments illustrated in the drawings are for a double-walled cup formed from thin-walled plastic material and intended especially for hot drinks. The double-walled cup comprises an outer cup 1 and a lining cup 2. FIGURES 1 and 2a show one construction in which the gap between the side walls of outer cup 1 and lining cup 2 is fixed by double-walled ribs 3. Ribs 3, which are integral with cup 1, extend inwardly from the outer side wall periphery of cup 1 and are sufficiently narrow that the external side wall surface of cup 1 has the appearance of being essentially round. These ribs 3 seat against the outer surface of cup 2 along a very narrow, practically line-shaped interface. As shown, ribs 3 extend between the bottom of cup 1 and a smoothly contoured, beaded rim 4 delimiting the mouth of the cup. Lining cup 2 can be formed with a smooth interior contour, such practice being advantageous for complete emptying of the drink during drinking.

As shown in FIGURE 2a, rim 4 comprises an outwardly projecting, curled, skirt portion of approximately semi-circular cross-section. The lining cup 2 is formed with a rounded rim section 5 at its outer end and a matching, ring-shaped collar 6. Collar 6 comprises an outwardly flared, marginal skirt which is integrally joined to the body of cup 2 by rim section 5. Section 5 and rim 4 advantageously are so formed, that they lie in contact throughout their entire opposed surfaces when lining cup 2 is loosely inserted into outer cup 1.

If it is desired to produce a continuous elastic tension in rim 4 during the beading operation, the rounded part of rim 4 is provided with a slightly larger radius of curvature than that given the section 5 on the edge of lining cup 2. Pressing of lining cup 2 into the outer cup 1 then immediately gives rise to the elastic tension in rim 4. In order to securely hold lining cup 2 in its pressed-in, internested position, depression 7b (see FIGURE 2d) are formed in the inner edges of ribs 3 to effectively define an inwardly opening, annular groove 7. Depressions 7b are disposed a short distance above the bottom of cup 1 and provides an annular shoulder 7a facing the cup bottom. Depressions 7b are suitably formed by notching or pressing portions of ribs 3 outwardly. A mating ring or annular lip 8 integrally formed on lining cup 2 snaps into and interfittingly seats in groove 7 to interlock behind shoulders 7a when cup 2 is pressed into cup 1. Cup 2 is thus securely held in its pressed-in position by seating engagement of ring 8 in groove 7. Ring 8, as shown, radially protrudes from the side wall periphery of cup 2.

FIGURE 2c shows the rims of cups 1 and 2 in finished form. In this figure, collar 6 is beaded into a lip roll 9 of hollow, ring-like, rounded contour. Rim 4 is beaded into lip roll 9 as a result of beading collar 6. Rim 4 is thus held under continuous elastic tension.

In the embodiment of FIGURES 3a and 3b, ribs 3, which retain the side wall portion 11 of cup 1 spaced outwardly from the opposing side wall periphery of cup 2, extends only along a limited length of the cup, this length being essentially confined to the region in which the double-walled cup is normally held in a person's hand.

In place of the locking ring and groove construction, the embodiment shown in FIGURES 3a and 3b provides for a wedged engagement of cup 2 in cup 1. This is accomplished by forming cup 2 with an annular ribbed region 12 extending around the side wall periphery of the cup near the bottom thereof. Ribber region 12 is formed by a series of circumferentially spaced apart, accurately-bottomed grooves or recesses which define outwardly and vertically or longitudinally extending ribs 13. The manner of wedging can be seen in FIGURE 3b.

Ribs 13 in region 12 are formed in such a way that they protrude, when undeformed, slightly outwardly beyond a conical envelope containing the outer periphery of lining cup 2. The opposing interior wall surface of cup near the bottom thereof. Ribbed region 12 is formed When lining cup 2 is shoved into outer cup 1, the outwardly projecting ends of ribs 13 come in contact with the inner surface of outer cup 1 and are pressed or deformed slightly inwardly when lining cup 2 and outer cup 1 are tightly pressed together. This can be seen at 14 in FIGURE 3b. In this way, lining cup 2 clings tightly to outer cup 1, even when lip roll 9 has not yet been formed. The annular interior region of cup 1 which is engaged by ribs 13 is below ribs 13 and somewhat above the bottom wall of cup 1.

After cups 1 and 2 are interlocked in assembled relationship, the cup assembly can be handled quite readily and easily. In particular, a transportation or conveyor device, to be described later on, can be used in which the bottom of outer cup 1 is sucked onto the lower side of a plate. Such a device is especially suited for placing the pairs of liner and outer cup parts into the beading machine. In the beading machine, the collar 6 is beaded around rim 4 of cup 1 and, in this way, rim 4 may be elastically deformed. In the final stamping and forming of lip roll 9, it is stabilized and thus a release of the stressed state in rim 4 at a later time is prevented.

Referring back to FIGURE 2a the bottom of cup 1 is curved concavely inwardly in its central region 22. Region 22 is peripherally surrounded by an annular, substantially flat bottom rim 21 which joins region 22 to the side wall of the cup. Cup 2 also has the central region 23 of its bottom curved concavely inwardly so that the concave cup bottom regions 22 and 23 matingly come in contact with each other when cup 2 is inserted into cup 1 and ring 8 locks in groove 7. The bottom regions 22 and 23 can, if desired, be slightly deformed elastically, so that an outward resilient biasing effect is exerted on cup 2 to urge ring 8 forwardly into interlocking engagement with shoulder 7a. Thus, the assembly of cups 1 and 2 already have a secure, tight hold even before the final fastening is made by the beading of the cup rims.

As shown in FIGURE 2a, ring 8 provides a downwardly facing annular shoulder 24 which seats against an opposing shoulder on cup 1 when cup 2 is nested therein.

In the embodiment of FIGURES 3a and 3b, the bottom of cup 2 is shown to be spaced above the bottom of cup 1.

The continuous production of double-walled cups according to the method of this invention is accomplished, for example, by the apparatus shown in FIGURES 4a and 4b. In this apparatus, a track or sheet 101 of thermoplastic material is advanced first with step-wise movement by a suitable conveyor device 109 through a heating zone 108. Sheet 101 is heated in zone 108 sufficiently for the subsequent forming. For example, sheet 101 is heated for a length of time such that it begins to hang or sag like a sack. The length of this heating zone 108 is equally as large as the stepmovement imparted to sheet 101 by conveyor device 109 and the effective working lengths of a forming machine 102 and a blanking machine 202. Conveyor device 109 may be of any conventional form having a belt or the like trained around motor driven rollers.

Forming machine 102 comprises a vacuum deep drawing apparatus having a female tool 102a mounted below a vacuum chamber 105. On the bottom side of tool 102a a swingable frame 110 is mounted for assuring an air tight seal. Forming machine 102 is generally the same as that described in the aforesaid copending application Ser. No. 400,642 to which reference is made for further detail. If needed, stretchers may be employed as described in application Ser. No. 400,642. Forming machine 102, along with its carriage and vacuum chamber 105, is movable up and down in a vertical direction and contains a number, for example 48 and more, of forming spaces. Of these, only four are shown in the drawing. The rearward half of forming tool, in the direction of sheet movement, is provided with article forming cavities 103 that are configured for producing lining cups 2. The forward half of tool 102a, with respect to the direction of sheet movement, has forming cavities 103a configured for the production of the outer cup 1. Forming cavities 103 and 103a are matched in number and arrangement and are connected to chamber 105 by passages 105a. Between the two groups of forming cavities 103 and 103a, there is a leg section 103b. Its width corresponds to the width of the piece that is formed between each batch of cups 1 and 2 for stiffening sheet 101. The section of sheet 101 heated in zone 108 is advanced in a single step-wise movement to a position where it is directly under tool 102a and seats against the outer edges of cavities 103 and 103a. By evacuating chamber 105, therefore, the portions of sheet 101 aligning with cavities 103 and 103a are sucked up into the cavities to thereby shape cups 1 and 2. Reference is made to the aforesaid application Serial No. 400,642 for further detail concerning this cup shaping operation.

The reference character 201 designates that portion of sheet 101 containing the formed, but uncut cups 1 and 2. Sheet portion 201 is fed into blanking machine 202, which also is essentially the same as the one described in application Ser. No. 400,642. Blanking machine 202, as shown in FIGURE 4b, comprises a receptacle 210 having blanking cutters 210a disposed vertically above a die table 220. Die table 220 has opening 221a and 221b. The lining cup and outer cup forms in sheet portion 201, are inverted and cut out by displacing cutters 210a downwardly. The cut-out cups 1 and 2 are dispensed from machine 202 by feeding them downwardly through openings 221a and 221b respectively.

A conveyor device 301 similar to device 109 has a belt or other horizontally extending support surface disposed vertically below openings 221a and 221b. The cut-out cups 1 and 2 thus drop in inverted positions onto the horizontal support surface of device 301. The length of step-wise advancement imparted to this horizontal conveyor support surface is equal to one-half the length of step-wise advancement imparted to sheet 101 by device 109. The step-wise movements applied by devices 109 and 301 are suitably synchronized with each other and with the operation of machines 102 and 202. The blanket-out forms of lining cups 3 are therefore first fed downwardly through openings 221a onto device 301 and are advanced in one step-wise movement to positions where they are vertically under and aligned with openings 221b so that the blanked-out outer cups 1 fall through their openings 221b directly onto the punched or cut out lining cups 2 sitting on device 301. FIGURE 2a shows the configuration of rim 4, rim section 5 and collar 6 upon removal of the cup pairs from machine 202.

From the foregoing description it is clear that the outer cups 1 of each batch dispensed from machine 202 is assembled on cup 2 formed in the preceding batch. Cups 2, being in the preceding batch, will be much cooler than cups 1 in the succeeding batch. Upon cooling, therefore, cups 1 shrink relative to cups 2 and thus more firmly grip cups 2 as the assemblies of internested inner and outer cups are advanced by conveyor device 301 to a device 501 for pressing and locking or wedging the cup pairs together.

Device 501 comprises a plurality of fingers 502 and pestles 503 fixed on the upper ends of fingers 502 and corresponding to the number of articles in each batch conveyed through the machine. Fingers 502 with their pestles 503 are pushed upwardly after every second step-wise movement of device 301. Their upward movement is accomplished by any suitable means such as, for example, an unshown pneumatic or hydraulic cylinder and piston arrangement. Pestles 503 are shifted through the conveyor support surface of device 301 until the pestles seat against the bottom of lining cup 2. The cut-out pairs of cups 1 and 2 are pressed by pestles 503 against a porous plate 504. This pressure is sufficient to first of all lock the lining and outer cups by interengagement of ring 8 and groove 9 when cups 1 and 2 are constructed according to the embodiment of FIGURE 2. Where cups 1 and 2 are constructed according to the embodiment of FIGURE 3, the pressure exerted by fingers 502 and pestles 503 wedge the ribbed region 12 into the smooth peripheral interior of cup 1 between ribs 3 and the bottom of the cup.

Still referring to FIGURE 4b, a casing mounted on plate 504 provides a suction chamber 506 which is delimited by the upwardly facing surface of plate 504. A line 505 is connected to provide a vacuum in chamber 506 above the porous plate 504 so that the cup pairs are held tightly in inverted positions against the bottom surface of plate 504 by suction when fingers 502 are drawn away. As soon as fingers 502 with their pestles 503 are withdrawn into their downwardly displaced positions, plate 504 is shifted in the direction of the arrow to a position where it is over a plate 402. There, the vacuum in the chamber 506 is released or replaced by a slight positive pressure so that the cup pairs are released onto supports 323 mounted on plate 402. Guiding fingers 404 may be associated with the supports 323 and are actuated by hydraulic or pneumatic cylinder and piston assemblies 407. As soon as the cup pairs are placed on supports 323, a multiple beading tool 423, which is movable upwardly and downwardly in the direction of the arrow 242a, is lowered. The construction and the operation of this multiple beading tool are the same in all sections and is generally the same as that described in the aforesaid copending application Ser. No. 400,642. The final configuration of the bead produced by tool 423 is shown in FIGURES 2c and 3a.

The removal of the finished, beaded, double-walled cups from supports 323 can be accomplished in any suitable manner, one example being the repeated use of a porous plate connected with a vacuum chamber.

In the embodiment of FIGURES 2a–2d, the formation of depressions 7b does not change the contour of the outer periphery of cup 1 since ribs 3 extend radially inwardly. If the appearance of an annular ring on the exterior of cup 1 is not objectionable, however, cup 1 may be constructed in the manner shown in FIGURE 5. In this embodiment, ribs 3 terminate a short distance above the cup bottom, and cup 1 is provided with a smooth, annular side wall 25 extending between the lower ends of ribs 3 and rim 21. An annular groove 26 is formed in wall 25 by pressing a portion thereof radially outwardly. Lip 8 snaps into and interfittingly seats in groove 26 to interlock cups 1 and 2 in internested relation in the same manner as described in the embodiment of FIGURES 2a–2d. An annular shoulder 27 formed in cup 2 seats against an opposed surface on cup 1 when cup 2 is nested in the outer cup.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a method for producing cup-shaped double-walled thermoplastic articles wherein the inner wall is defined by a liner and the outer wall by a cover and wherein both walls are joined at the opening end in a beaded rim, said method comprising the steps of providing separate forming and blanking stations, advancing a sheet of thermoplastic material successively through said stations, shaping said liners and covers in successive batches in said sheet at said forming station, blanking out each batch of thusly shaped liners and covers from said sheet at said blanking station, dispensing the thusly blanked-out batch of covers from said blanking station directly onto liners formed and blanked out in a preceding batch to assemble each cover in nested relation over an associated liner for providing the inner and outer walls of said article, and thereafter beading the open end of each liner around the open end of its associated cover to form said beaded rim.

2. The method defined in claim 1 comprising the steps of heating said sheet to effect the shaping of said liners and covers at said shaping station, advancing the shaped liners and covers to be blanked out at said blanking station while still warm, allowing the liners in said preceding batch to cool relative to the covers in which they are received, and allowing said covers to cool on said liners to thereby shrink and grip said liners.

3. The method defined in claim 1 wherein during beading of the open end of each liner, the open end of each liner is curled back toward said outer wall and into a ring-like roll around the open end of said cover to form said rim and to fasten said liner to its associated cover.

4. The method defined in claim 1 wherein the liners and covers of each batch are simultaneously shaped and blanked out at said forming and blanking stations respectively.

5. The method defined in claim 4 wherein the liners of said preceding batch are dispensed from said blanking station and advanced in inverted positions to locations vertically below respective covers in the succeeding batch, and wherein said covers are dispensed from said blanking station in inverted position to drop onto the inverted liners in said preceding batch.

6. The method defined in claim 5 wherein said covers loosely seat on the liners of said preceding batch upon being dispensed from said blanking stations, and wherein prior to beading of the outer end of each liner but after said covers are loosely seated on said liners, said method further comprises the step of securing each liner in its respective cover by applying pressure to axially advance each liner further into its respective cover.

7. In a method for producing double-walled, thermoplastic articles wherein the inner wall is defined by a liner and the outer wall by a cover and wherein both walls are formed at an open end in a beaded rim, the steps comprising separately forming said liner and said cover, imparting relative motion to said cover and liner to assemble said liner in said cover, interlocking said liner and said cover and thereby provide said inner and outer walls of each finished article to prevent outward displacement of said liner, and thereafter beading the open end of said liner around the open end of said cover to provide the assembly of said cover and inserted liner with a beaded rim around the mouth thereof.

8. The method defined in claim 7 wherein said liner and cover are interlocked by applying axially opposed pressures to wedge said liner in said cover.

9. The method defined in claim 7 wherein said liner and cover are interlocked by providing abutment surfaces on said cover and said liner and by relatively advancing said liner into said cover to move the liner abutment surface beyond the cover abutment surface and to seat against said cover abutment surface.

10. The method defined in claim 7 wherein during beading of said liner, the open end of said liner is curled back toward said outer wall and into a ring-like roll around the open end of said cover to form said rim with a rounded contour and to fasten said cover and said liner together.

11. The method defined in claim 7 wherein successive batches of the liners and covers are simultaneously shaped and then simultaneously cut out from the same sheet of material.

12. The method defined in claim 11 wherein the covers of one batch are placed on the liners of the preceding batch.

13. The method defined in claim 12 wherein said covers of said one batch are first loosely placed on the liners of said preceding batch and wherein the inserted liners are then interlocked to their associated covers by relatively advancing them a further predetermined distance into their associated covers.

14. The method defined in claim 13 wherein said liners are interlocked with their associated covers at one station and then advanced in inverted positions with the mouths of said liners facing downwardly to a second station where said beaded rims are formed thereon.

15. A method for producing cup-shaped double-walled thermoplastic articles wherein the inner wall of each article is defined by a liner cup, wherein the outer wall of each article is defined by an outer cup, and wherein both the inner and outer walls of each article are joined at the opening end in a beaded rim, said method comprising the steps of providing separate shaping and blanking stations, advancing a sheet of thermoplastic material successively through said stations, at said shaping station forming in successive batches the liner cups each with an outwardly extending collar comprising an outwardly flared marginal skirt and the outer cups each with an outwardly extending rim portion surrounding the outer cup opening, blanking out each batch of thusly shaped liner cups and outer cups from said sheet at said blanking station, and dispensing said thusly blanked-out batch of outer cups from said blanking station directly onto said liner cups shaped and blanked out in a preceding batch to form pairs each containing of a liner cup and an outer cup, axially pressing together the liner cup and outer cup of each of said pairs to engage the said outwardly extending rim portion of the outer cup against said outwardly extending collar of said liner cup, and curling said outwardly extending collar of said liner cup into a ring-like roll of rounded contour around said outwardly extending rim portion of said outer cup to form said beaded rim.

16. The method defined in claim 15 comprising the steps of forming at said shaping station cooperating locking formations on the liner and outer cups of each of said pairs, loosely nesting the outer cups over their associated liner cups as they are dispensed from said blanking station, and thereafter inter-engaging said formations of said liner and outer cups of each pair are axially pressed together to interlock the liner and outer cups of each pair before said collar is curled around said rim portion to form said beaded rim.

17. A method for producing double-walled, thermoplastic articles wherein the inner wall is defined by a liner cup and the outer wall by an outer cup and wherein both walls are formed at an open end in a beaded rim, the steps comprising separately shaping the liner cups to have an outwardly extending collar comprising an outwardly flared marginal skirt, shaping the outer cups to have an outwardly extending rim portion surrounding the outer cup opening, imparting relative motion to said outer cups and liner cups to nest one liner cup into one outer cup and to engage said outwardly extending rim portion of said outer cup with said outwardly extending collar of its associated liner cup, and thereafter curling said outwardly extending collar of said liner cup into a ring-like roll of rounded contour around said outwardly extending rim portion of the associated outer cup to form said beaded rim.

18. A method for producing double-walled, thermoplastic articles wherein the inner wall is defined by a liner cup and the outer wall is defined by an outer cup and wherein both walls are formed and fastened together at the open end of said article in a beaded rim, the steps comprising shaping the liner cups and the outer cups in succesive batches with the outer cups being shaped in a forward portion of each batch, with the liner cups being shaped in a rearward portion of each batch and being equal in number to the outer cups shaped in said forward portion of each batch, and with all of the cups in each batch being simultaneously shaped, forming each liner cup as it is shaped with an outwardly flaring collar comprising an outwardly flared marginal skirt at the open end of the cup, forming each outer cup as it is shaped with an outwardly extending rim portion surrounding the outer cup opening, blanking out the liner cups and outer cups in each batch after shaping, moving the blanked outer liner cups of one batch vertically below the region where the outer cups of a succeeding batch are blanked out, thereafter imparting relative vertical motion to the liner cups from said one batch and to the outer cups from said succeeding batch to nest each outer cup over one of the inner cups to assemble the liner and outer cups in pairs and to engage said outwardly extending rim portion of each outer cup with the outwardly extending collar of its associated liner cup, and thereafter curling the outwardly extending collar of each liner cup into a ring-like roll of rounded contour around the outwardly extending rim portion of the associated outer cup to form said beaded rim.

References Cited
UNITED STATES PATENTS

| | | | |
|---|---|---|---|
| 2,090,528 | 8/1937 | Ferngren | 264—163 |
| 2,859,575 | 11/1958 | Lehmann | 264—296 |
| 2,953,814 | 9/1960 | Mumford | 264—163 |
| 3,052,926 | 9/1962 | Quinche | 18—59 |
| 3,115,677 | 12/1963 | Thiel | 264—92 |
| 3,120,570 | 2/1964 | Kennedy | 264—269 |
| 3,207,830 | 9/1965 | Aldington | 264—249 |
| 3,244,780 | 4/1966 | Levey | 264—294 |
| 3,247,302 | 4/1966 | Lewis | 264—263 |

ROBERT F. WHITE, *Primary Examiner.*

R. R. KUCIA, *Assistant Examiner.*